Figure 1:
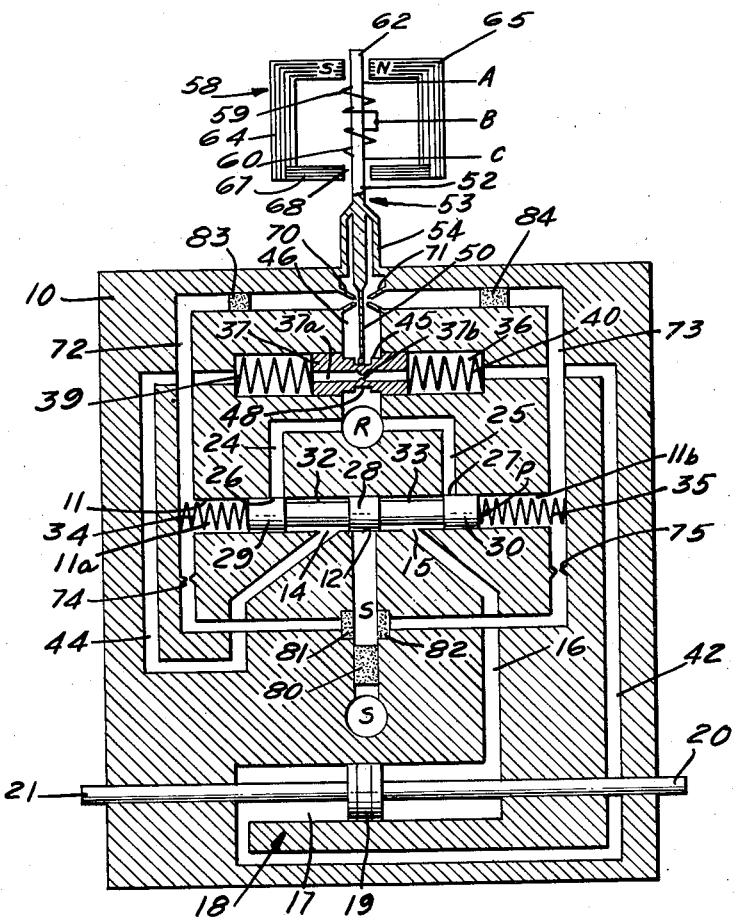

Aug. 27, 1963   J. W. BLANTON   3,101,650
HYDROMECHANICAL RATE DAMPED SERVO SYSTEM
Filed Feb. 24, 1959   2 Sheets-Sheet 1

JOHN W. BLANTON,
INVENTOR.
WHANN & McMANIGAL
Attorneys for Applicant

JOHN W. BLANTON,
INVENTOR.
WHANN & McMANIGAL
Attorneys for Applicant

United States Patent Office 3,101,650
Patented Aug. 27, 1963

3,101,650
HYDROMECHANICAL RATE DAMPED
SERVO SYSTEM
John W. Blanton, Sunland, Calif., assignor, by mesne assignments, to Bell Aerospace Corporation, Buffalo, N.Y., a corporation of Delaware
Filed Feb. 24, 1959, Ser. No. 795,177
10 Claims. (Cl. 91—433)

This invention relates generally to servomechanisms and relates more specifically to servomechanisms employing hydraulic and pneumatic fluids for the control of mechanical motions.

Servomechanisms used for the control of devices which have large dynamic time lags such as gas turbines and turbo jet engines are required to generate dynamic time lead or error rate anticipation in order to provide for optimum overall dynamic system performance.

For example, in the control of angular velocity of a hot gas turbine system, said hot gas turbine can have a response time or lag time of several seconds. If it is desired to limit transient speed errors to less than the response time of the turbine system it becomes mandatory that the speed control mechanism contain a lead time constant of sufficient order or magnitude to significantly reduce or cancel the basic lag time of the turbine system. Conventional techniques for accomplishing the generation of lead time constants employ the use of electromechanical transducers, electronic amplifiers and passive electrical networks.

In mechanisms of the present type the actuator has a design velocity of a predetermined value and with the usual type of servo mechanism control there is an appreciable interval of time elapsing before the actuator mechanism attains such design velocity from a stationary, or substantially stationary, position after a corrective signal has been given to the pilot valve mechanism. The desired operation is, of course, to get the actuator up to its design velocity in as short a period of time as possible.

The amount of force or power required to get the actuator to start moving and to accelerate it to the designed velocity is much greater than the force required to maintain its movement after it has reached its predetermined design velocity.

With the load sensing arrangement of the present invention, when a corrective signal is given to the servo mechanism, the power valve thereof is moved to a relatively wide open position so that a powerful hydraulic force is applied to the actuator which accelerates it to said design velocity in a much shorter time than would otherwise be the case.

The load sensing means includes a piston having a calibrated, restricted orifice providing a fluid connection between the ends thereof and centering springs and the characteristics of the load sensing means are determined by the effective pressure areas of the piston, the size of the orifice, and the rates of the springs.

When the actuator has reached its designed velocity the feedback arrangement of the present invention moves the pilot valve in a direction to overcome the effect of the original signal, so that the various parts of the servo mechanism return to substantially the neutral position, thereby reducing the fluid pressure to the actuator to a value substantially lower than the initial pressure applied thereto, but of a sufficient value to continue the movement of the actuator if such movement is called for.

The feedback mechanism is a mechanical but resilient connection between the load sensing means and the pilot valve.

When a corrective signal is given to the pilot valve there is a slight delay in the operation or action of the load sensing means and this slight delay is termed "the lag." It is due to this lag that the initial powerful hydraulic pressure is given the actuator to reduce the time normally required to accelerate it to the design velocity. There is therefore a time difference between the time the actuator is accelerated to the design velocity by reason of the present invention and the time normally required without the present arrangement. The operation or functioning of the load sensing means during this difference in the time required to accelerate the actuator to the design velocity is considered the lead part of the operation.

The following invention provides a simplified technique for generating a mechanical control which incorporates dynamic time lead or rate anticipation in a manner which eliminates complex electromechanical and electronic elements and thus provides improved reliability with fewer parts.

It is, therefore, an object of the present invention to provide a servomechanism for controlling hydraulic prime movers wherein the overall reliability thereof is greatly improved.

It is another object of the invention to provide mechanism of this character which provides a very high degree of accuracy.

It is still another object of the invention to provide a mechanism of this character having greatly improved damping characteristics so that the actuators have maximum stability.

A further object of the invention is to provide a device of this character that provides error rate damping for a hydraulic servo valve and actuator mechanism.

A still further object of the invention is to provide a device of this character which provides actuator output velocity and acceleration proportional to the servo valve input error.

Another object of the invention is to provide an integrated velocity servo system.

Still another object of the invention is to provide a servo valve mechanism of this character that is extremely simple in construction and operation.

A further object of the invention is to provide a device of this character having a dynamic type valve.

A further object of the invention is to provide mechanism of this character that is relatively inexpensive to manufacture.

A still further object of the invention is to provide mechanism of this character wherein maintenance costs are relatively low.

The characteristics and advantages of the invention are further sufficiently referred to in connection with the following detailed description of the accompanying drawings which represent certain embodiments. After considering this example, skilled persons will understand that variations may be made without departing from the principles disclosed and I contemplate the employment of any structures, arrangements or modes of operation that are properly within the scope of the appended claims.

Figure 2:
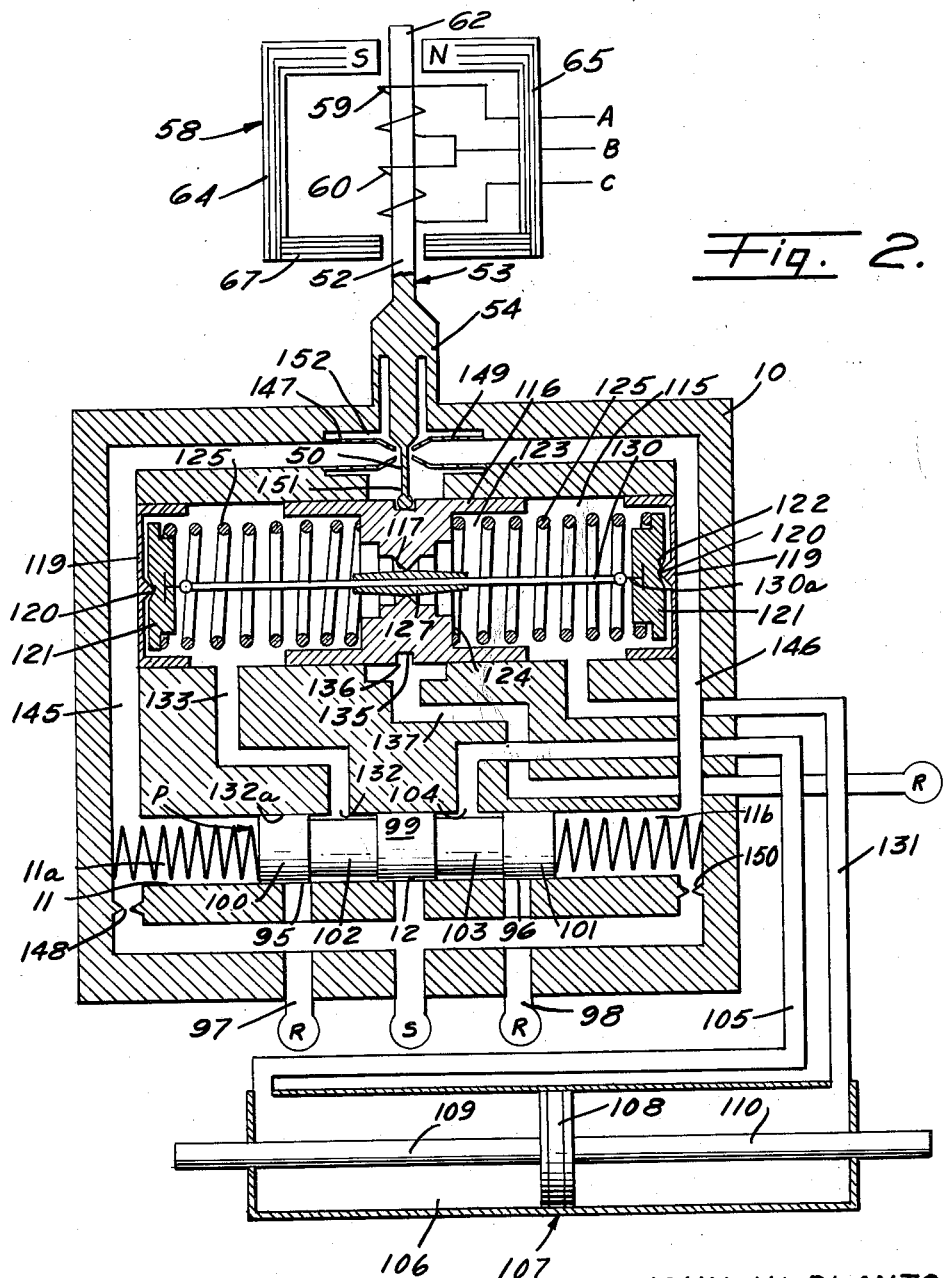

Referring to the drawing:

FIG. 1 is a schematic sectional view of the servo actuator mechanism embodying the present invention; and FIG. 2 is a similar view of an alternative arrangement.

Referring more particularly to the drawings, there is shown a housing 10 having a bore 11 for a power valve, indicated generally at P.

There is a fluid pressure supply passage S in the body which is connected to any suitable source of fluid under pressure, said source not being shown. This passage is connected with the bore 11 through a port 12 intermediate the ends of said bore and substantially at the longitudinal center thereof. At each side of the port 12 and spaced longitudinally therefrom are ports 14 and 15, the latter being connected by means of a passage 16 with the cylinder 17 of an actuator, indicated generally at 18, said passage 16 being connected to said cylinder 17 at one end thereof. The actuator 18 is provided with an actuator piston 19 which is slidably disposed in said cylinder 17 and which is provided with oppositely extending connecting rods 20 and 21 respectively arranged axially with respect to said piston. The piston rods 20 and 21 may be connected, in the usual well-known manner, with a device to be actuated.

The hydraulic system has a return port R connected by means of respective passages 24 and 25 with ports 26 and 27 of the bore 11, said ports 26 and 27 being spaced apart longitudinally of the bore 11 and substantially equal distances from and at opposite sides of the port 12.

Within the bore 11 is slidably disposed the valve P which comprises a central spool 28 which, when the valve P is centered as shown in the drawing, closes the port 12. There are end valve spools 29 and 30 in axial alignment with the spool 28 and said end spools 29 and 30 are connected to the central spool by axially arranged reduced diameter parts 32 and 33 which extend in opposite directions from the spool 28. When the spool 28 is centered in the bore 11, the spools 29 and 30 are spaced somewhat outwardly of the ports 14 and 15 so that the latter are open. Normal centering of the valve P is effected by springs 34 and 35 in the outer end portions of the bore 11 which is substantially longer than the valve P so as to provide outer end portions or spaces which permit operative movement of the valve longitudinally in the bore 11 and these portions or spaces provide room for the springs 34 and 35. Another function of the end portions or spaces of the bore 11 is to serve as pressure chambers identified herein as chambers 11a and 11b.

There is a hydraulic feedback arrangement which includes a feedback bore 36 in which is slidably disposed a feedback piston 37 which is normally centered longitudinally in the bore 36 by means of springs 39 and 40. Piston 37 has a longitudinally extending bore 37a therethrough with a fixed restricted orifice 37b therein. The bore 36 is longer than the piston 37 and said springs 39 and 40 are disposed in the outer end portions of the bore 36 at opposite sides of said piston 37 which is adapted to operably slide in said bore 36.

As shown in FIG. 1 the right-hand end of the bore 36 is connected by means of a passage 42 with the left-hand end of the cylinder 17 of the actuator 18, the right-hand end of said cylinder being connected with the passage 16. The left-hand end of the bore 36 is connected by means of a passage 44 with the port 14 of the bore 11.

The feedback piston 37 has an annular relieved part 45 at its longitudinal center to provide a fluid flow space about the piston and through a passage 46 having one end connected with the return port R, said passage intersecting the bore 36 adjacent its longitudinal center. The reduced diameter portion 45 of the feedback piston 37 is provided with an annular groove 48 located at the longitudinal center of the piston for operative reception of the free end of a feedback spring 50 connected at its other end to the lower or inner end of a stem 52 of a flapper valve indicated generally at 53. The passage 46 extends outwardly of the bore 36 and said feedback spring 50 and the lower or inner end of said stem 52 are operably disposed therein. The lower end portion of the stem 52 is sealed to prevent leakage therepast by means of a tubular, isolation diaphragm 54 which provides a flexible pivotal support for said stem as well as a seal therefor. An example of such a diaphragm is disclosed in the Baltus et al. application Serial No. 647,255, filed March 20, 1957, now U.S. Patent No. 2,947,285.

Various means may be used to actuate the valve 53 by the actuation of the upper portion of the stem 52 which pivots at the isolation diaphragm, the stem 52 being movable clockwise and counterclockwise, as viewed in the drawing, to move the leaf spring 50 accordingly.

One means for actuating the valve 53 comprises a torque motor, indicated generally at 58, and comprises coils 59 and 60 connected to suitable electrical equipment, not shown, by wires A, B and C.

The upper portion 62 of the stem 52, exterior of the diaphragm 54, comprises an armature which is operably disposed relative to the coils 59 and 60 so that energization of either of said coils will effect operative movements of the armature 62 and stem 52 clockwise or counterclockwise according to which of said coils is energized. It is to be understood that the armature is of suitable material to be magnetically actuated, the material being a soft steel or the like for example.

Torque motor 58 also includes a pair of oppositely arranged frames 64 and 65 which are in the general shape of inverted L's. The lower ends of the frames 64 and 65 are operably attached in the usual well-known manner to a magnet 67 having an opening 68 therein through which the stem 52 extends. The adjacent free ends of the horizontal portions of the frames 64 and 65 are spaced apart with the upper end of the armature 62 operably disposed therebetween. The space between said free ends of the frames 64 and 65 is sufficiently great to permit proper operative movements of said armatures and said adjacent ends of the frames 64 and 65 are of opposite polarity, one being a south pole and the other being a north pole.

The flat feedback spring 50 is adapted to be disposed centrally between the open ends of a pair of nozzles 70 and 71 which are spaced apart and spaced from said spring, when in the neutral or normal position, equal distances. The nozzles 70 and 71 are connected by means of passages 72 and 73 which, in turn, are connected with the pressure supply passage S. Passages 72 and 73 are provided with respective restricted calibrated orifices 74 and 75 and passages 72 and 73 are connected respectively to the chamber portions 11a and 11b of the bore 11, said connection being downstream of the respective orifices 74 and 75.

The hydraulic system also may be provided with suitable filters, there being a filter 80 in the supply passage S, filters 81 and 82 in the respective passages 72 and 73 anterior to the orifices 74 and 75, said passages 72 and 73 also having filters 83 and 84 therein between the nozzles and the points of connection with the respective chambers 11a and 11b.

The nozzles 70 and 71 discharge into the passage 46 and fluid from said nozzles flows through said passage 46 to the return port R.

As pointed out above, the valve 53 is actuated when an electrical input signal is transmitted from a suitable sensing device to one or the other of the coils 59, 60. Should the coil 59 be provided with such input signal, the armature 62 is attracted by the coil 59 in accordance with the value of said signal and said stem 52 is moved counterclockwise, pivoting at the isolation diaphragm 54. This movement of the stem will cause the flapper leaf 50 to move toward the open end of the nozzle 71 and restrict flow of fluid therefrom to effect a build-up of fluid pressure downstream of said nozzle and in the chamber 11b and at the same time urge the feedback piston toward the right. Restriction of fluid flow from the nozzle 71 will cause the pressure in the passage 73 downstream of the restricted orifice 75 to increase relative to the pressure in the passage 72 downstream of the orifice 74 and in the chamber 11a. Thus, there is an unbalancing of the pressures acting at opposite ends of the valve P with the higher pressure acting on the outer face of the spool 30 so that said valve P will move to the left, as viewed in FIG. 1. This movement of the valve P will cause uncovering of the port 12 so that pressure fluid will flow into the annular space between the reduced diameter part 33 of the valve P and the adjacent wall portion of the bore 11. This pressure fluid will pass through the port 15, into the conduit 16 and into that portion of the cylinder 17 which is at the right of the piston 19 as viewed in FIG. 1.

Simultaneously with the opening of the port 12, the spool 29 will move sufficiently to the left to uncover the port 26 so that pressure fluid in the annular space between the reduced diameter part 32 of the valve P and the adjacent portion of the bore 11 may flow into the passage 24 and to the return port R from which it will return to any suitable reservoir or the like provided to receive same.

When the port 12 has been opened so that pressure fluid will flow into the right-hand end of the cylinder 17, the piston 19 will be moved leftwardly and fluid in that portion of the cylinder 17 to the left of the piston 19 is forced out of said portion of the cylinder, through the passage 42 and into the right-hand end of the bore 36 to urge the feedback piston 37 to the left causing fluid in the bore 36 and to the left of the piston 37 to flow in the passage 44 at a rate proportional to the actuator velocity. From the passage 44 fluid flows through the port 14, into the annular space between the spools 28 and 29, into the passage 24 and to the return port R. The piston 37 will return to the normal central position due to the bleeding of fluid through the passage 37a and fixed orifice 37b in the piston 37. The flow through the orifice develops a pressure drop across the orifice proportional to the flow rate or actuator velocity. The orifice pressure drop develops an unbalanced force across the piston which is balanced out by force proportional to the spring rate of the centering springs 39 and 40 times the piston deflection. This deflection of the piston is fed back to the servo valve flapper or feedback spring 50 in phase opposition to the initial error generating signal from the torque motor 58 to produce a negative signal proportional to the system actuator velocity. Since the piston 37 is spring loaded to center and has a bypass orifice the washout or decay characteristic required is achieved by the fact that the piston 37 is returned to the neutral position by the respective spring forcing the entrapped oil on one side of the piston through the orifice as the piston is returned to the center or neutral position.

The pressures in the system will then become equalized and the spool valve P will be returned to its neutral position thereby cutting off further flow of pressure fluid to the actuator and flow therefrom so that the piston 19 of the actuator will be held in the new position.

When the coil 60 of the torque motor 58 is provided with an input signal, the armature 62 is attracted by said coil 60 in accordance with the value of said signal and the stem 52 is moved clockwise, again pivoting at the isolation diaphragm 54. This movement of the stem will cause the flapper leaf 50 to move toward the open end of the nozzle 70 and restrict flow of fluid therefrom to effect a build-up of fluid pressure downstream of said nozzle and in the chamber 11a, and at the same time urge the feedback piston toward the left. Restriction of fluid flow from the nozzle 70 will cause the pressure in the passage 72, downstream of the restricted orifice 75, to increase relative to the pressure in the passage 73 downstream of the orifice 74 and in the chamber 11a. Thus, there is an unbalancing of the pressures acting at opposite ends of the valve P with the higher pressure acting on the outer face of the spool 29 so that said valve P will move to the right, as viewed in FIG. 1. This movement of the valve P will cause uncovering of the port 12 so that pressure fluid will flow into the annular space defined by the reduced diameter part 32 of the valve P and the adjacent wall of the bore 11. This pressure fluid will pass through the port 14, into the conduit 44 and into the left hand end, as viewed in FIG. 1 of the feedback bore 36 to thereby subject the adjacent ends of the feedback piston 37 to the pressure in passage 44, said pressure being derived from the pressure source.

The fluid pressure on the left hand end of the feedback piston 37 urges said piston toward the right, as viewed in FIG. 1, and said pressure is therefore transmitted through said piston 37 to the fluid in the right hand end of the feedback bore 36 and thence through the passage 42 and into the portion of the actuator cylinder 17 at the left of actuator piston 19 to thereby cause said piston to be urged toward the right by fluid pressure.

Simultaneously with the opening of the port 12, the spool 30 will move sufficiently to the right to uncover the port 27 so that fluid pressure in the annular space between the reduced diameter part 32 of the valve P and adjacent portion of the bore 11 may flow into the passage 25 and to the return port R from which it will return to any suitable reservoir or the like provided to receive same.

The functioning of the fluid feedback arrangement, by the bleeding of fluid through the fixed orifice 37b in the feedback piston 37 is substantially the same as the functioning thereof described hereinabove.

In the arrangement shown in FIG. 2 the body 10 is provided with a bore 11 for the power valve P.

There is a fluid pressure supply passage S in the body which is connected to any suitable source of fluid pressure. The passage S has a connection with the bore 11 through a port 12 intermediate the ends of the bore and substantially at the longitudinal center thereof. At each side of the port 12 and spaced longitudinally therefrom a substantially equal distance are ports 95 and 96 which are connected respectively to return passages 97 and 98 which may lead to a common passage to a fluid reservoir R or the like or may individually lead to said reservoir, said passages 97 and 98 being fluid return passages.

The valve P comprises a central spool 99 which, when said valve P is centered as shown in the drawing, closes the port 12. There are end spools 100 and 101 in axial alignment with the spool 99 and said end spools 100 and 101 are connected to the central spool 99 by axially arranged reduced diameter parts 102 and 103 respectively. When the spool 99 is centered the spools 100 and 101 close the respective ports 95 and 96.

At a point between the spools 99 and 101 there is a port 104 which communicates with the annular space defined by the reduced diameter portion 103, the adjacent wall portion of the bore 11 and the respective spools 99 and 101. Port 104 is connected by means of a conduit 105 with the left-hand end of a cylinder 106 of an actuator, indicated generally at 107. Within the cylinder 106 there is operably disposed a piston 108 which is provided with oppositely extending connecting rods 109 and 110 which extend through the end walls of the actuator cylinder and which may be connected to any device to be actuated.

There is a feedback mechanism which includes the cylinder 115 in which is slidably disposed a feedback piston 116 which has a passage therethrough with an orifice 117 therein. Within the cylinder 115 and disposed at the respective ends thereof are members 119 each of which has an inwardly projecting conical boss 120. There is a spring retainer for each end of the cylinder 115, each spring retainer having a conical recess 122 at the outer side in which the respective boss 120 is received and on which the spring retainer fulcrums. The piston 116 is provided with a relatively large recess 123 in each end and there is a shoulder 124 at the inner end of each recess. A spring 125 is provided at each side of the piston and each spring reacts between the respective shoulder 124 and adjacent spring retainer 121.

The effective area of the orifice 117 is variable and is controlled by means of a control member 127. Member 127 has its greatest diameter at its longitudinal center and from said center tapers outwardly to the reduced diameter ends. Means for securing the member 127 at the longitudinal center of the cylinder 115 comprises a rod 130 to which said member 127 is secured. The ends of said rod are flexibly secured to respective adjacent spring retainers by means of anchors 130a. Thus, the piston 116 is normally centered in the cylinder 115 with the member 127 also centered therein so that the orifice 117 is normally of minimum area.

The opposite or right-hand end of the cylinder 106 is connected to the cylinder 115 by means of a conduit 131 which connects to said cylinder 115 at a point to the right of the piston 116 so that there is always free communication between the conduit 131 and said cylinder. The other end of the cylinder 115 is connected to a port 132 of the bore 11 by means of a conduit 133, port 132 being located to communicate with the annular space defined by the reduced diameter portion 102, the adjacent wall portion of the bore 11 and the spools 99 and 100.

The piston 116 is provided with an exterior annular groove 135 at the longitudinal center thereof and there is a port 136 for the cylinder in communication with said groove. From the port 136 a pressure fluid return conduit 137 leads to the above referred to reservoir.

There are a pair of oppositely arranged branch passages 145 and 146 connected to the conduit S so as to receive pressure fluid therefrom. The passage 145 leads to a nozzle 147 and is in communication with the end portion 11a of the bore 11, there being a restricted orifice 148 in said passage 145 anterior or upstream of its connection with the bore portion 11a. Passage 146 is connected to a nozzle 149 arranged oppositely of the nozzle 147, the outlets of said nozzles being adjacent each other in opposed relationship and spaced apart. Passage 146 has a connection with the bore portion 11b of the bore 11 and there is a restricted orifice 150 in said passage 146 anterior or upstream of the point of connection with the bore portion 11b.

The flapper valve or feedback spring 50 has its free end disposed in the groove 135 of the piston 116, said spring extending into a passage 151 between the chamber 152 and cylinder 115. The flapper valve 53 operates as hereinabove described and fluid discharge from the nozzle into the chamber 152 flows through the passage 151, into the groove 135 and thence into the return passage 137.

The mechanism of FIG. 2 operates in substantially the same manner as the mechanism of FIGURE 1 except that the piston 116 has a variable area orifice which is opened when the piston moves in either direction in its neutral position. The amount of opening of the orifice 117 is determined by the amount of travel of said piston.

As oil flows through the orifice 117 a pressure drop develops across the orifice causing the piston to deflect directly proportional to the pressure drop and, therefore, proportional to the flow rate of fluid or oil. The piston deflection is fed back to the flapper 50 in phase opposition to the initial input signal, thereby generating error rate damping.

The device thus measures and feeds back to the flapper the time derivative of flow at a predetermined time lag thus producing a closed loop system which has an output flow rate proportion to the input and time derivative of input current to the torque motor of the valve.

Since the arrangement shown in FIG. 2 has a variable orifice in the load sensing piston, greater linearity of operation is effected than is effected with the fixed orifice arrangement.

It is thought that the invention and many of its attendant advantages will be understood from the foregoing description and it is believed that it will be apparent that various changes may be made in the form, construction and arrangement of the parts of the invention without departing from the spirit and scope thereof or sacrificing all of its material advantages, the embodiments hereinbefore described being merely for purposes of illustration.

I claim:

1. In a hydraulic control mechanism: a fluid pressure actuator mechanism adapted to be connected to a device to be actuated, said actuator having a part movable in opposite directions by fluid pressure; power valve means including a movable valve member; yielding means normally balancing said valve member at a neutral position whereat the mechanism is inoperative; feedback means including a feedback cylinder; a feedback piston slidable therein and having a passage therethrough with a restricted orifice therein; oppositely acting yielding means normally positioning said piston in a neutral position; a main pressure supply conduit connected with the power valve means; a conduit connecting said power valve means with one side of said actuator; a conduit connecting the other side of said actuator with one end of the feedback cylinder; a conduit connecting said power valve means with the other end of said feedback cylinder; a pair of opposed nozzles spaced apart; a conduit connecting said supply conduit with one of said nozzles and having a restricted orifice therein, said conduit also having a connection with one side of said movable valve member downstream of said orifice; a conduit connecting said supply conduit with the other nozzle and having a restricted orifice therein and a connection, downstream of said orifice, with the other side of said movable valve member; a flapper valve having a resilient part operably mounted between the discharge ends of said nozzles and having an operable connection with the feedback piston; and a torque motor for actuating said flapper valve, said flapper valve, when moved toward one of said nozzles causing an unbalancing of the fluid pressure on the power valve member which effects a fluid connection between the pressure supply conduit and power valve, between said power valve and pressure actuator and between said power valve and feedback cylinder.

2. In a hydraulic control mechanism: a fluid pressure actuator mechanism adapted to be connected to a device to be actuated, said actuator having a part movable in opposite directions by fluid pressure; power valve means including a movable valve member; yielding means normally balancing said valve member at a neutral position whereat the mechanism is inoperative; feedback means including a feedback cylinder; a feedback piston slidable therein and having a passage therethrough with a restricted orifice therein; yielding means normally positioning said piston in a neutral position; a main pressure supply conduit being connected with the power valve means; a conduit connecting said power valve means with one side of said actuator; a conduit connecting the other side of said actuator with one end of the feedback cylinder; a conduit connecting said power valve means with the other end of said feedback cylinder; a pair of opposed nozzles spaced apart; a conduit connecting said supply conduit with one of said nozzles and having a restricted orifice therein, said conduit also having a connection with one side of said movable valve member downstream of said orifice; a conduit connecting said supply conduit with the other nozzle and having a restricted orifice therein and a connection, downstream of said orifice, with the other side of said movable valve member; a flapper valve having a resilient part operably mounted between the discharge ends of said nozzles and having a connection with the feedback piston; and means for controlling said flapper valve.

3. In a hydraulic control mechanism: a fluid pressure actuator mechanism adapted to be connected to a device to be actuated, said actuator having a part movable in opposite directions by fluid pressure; an actuator fluid pressure conduit system connected with said actuator mechanism for supplying pressure fluid to selectively operate said part in opposite directions; control means for controlling said fluid pressure in said conduit system, said means including a valve normally balanced at a neutral position whereat pressure fluid to said actuator is cut off; a pair of conduit means connecting said control means to opposite sides of said actuator part for actuating same in opposite directions; a hydraulic control system for said control means including a main supply passageway and branch passageways from said main passageway, said branch passageways being connected to normally apply fluid pressure of equal value to the opposite ends of said valve and having respective restricted orifices therein upstream of said connections; means downstream of the connections of said branch passageways to control the pressure therein and to vary the pressure in one of said branch passageways relative to the pressure in the other of said branch passageways; and actuator velocity responsive means comprising a cylinder interposed in one of said pair of conduits; a piston in said cylinder, said piston having a restricted opening therethrough; yielding means for normally positioning the piston in a neutral position; the means for controlling the pressure in said branch passageways being operably connected to said piston.

4. Control means for controlling fluid pressure in a hydraulic actuator system, including: means defining a cylindrical bore and a valve member slidable in said bore for controlling fluid pressure in said actuator system; yielding means urging the valve member to a normally balanced neutral position; a hydraulic control system for said valve member including a main supply passageway; a first passageway from said main passageway to one side of said valve member, said passageway having a restricted orifice upstream of its connection with said valve member; a second passageway from the main supply passageway to the other side of said valve member, said second passageway having a restricted orifice therein upstream of the connection with the other side of said valve member; oppositely arranged aligned respective nozzles for the first and second passageways, downstream of the respective orifices therein, the open ends of said nozzles being spaced apart; means including a flapper valve disposed between said nozzles for controlling the discharge of fluid from said nozzles to thereby unbalance the fluid pressures at opposite ends of said valve member to thereby effect actuation thereof; feedback means including a feedback cylinder and a feedback piston slidable therein, said feedback piston having a passage from one end to the other thereof with a fixed restricted orifice therein; oppositely acting springs normally positioning the feedback piston in a neutral position, said flapper valve being operably connected to the feedback piston; and a fluid connection between the power valve and one side of said feedback piston, the other side of said feedback piston being adapted to be connected to one side of a pressure operated actuator and said power valve being adapted to be connected to the other side of such an actuator.

5. Control means for controlling fluid pressure in a hydraulic actuator system, including: means defining a cylindrical bore and a valve member slidable in said bore for controlling fluid pressure in said actuator system; yielding means urging the valve member to a normally balanced neutral position; a hydraulic control system for said valve member including a main supply passageway; a first passageway from said main passageway to one side of said valve member, said passageway having a restricted orifice upstream of its connection with said valve member; a second passageway from the main supply passageway to the other side of said valve member, said second passageway having a restricted orifice therein upstream of the connection with the other side of said valve member; means for controlling the pressure in said first and second passageways downstream of the orifices therein, and to effect unbalancing of the fluid pressures at opposite ends of said valve member to thereby effect actuation thereof; feedback means including a movable feedback member having a fixed restricted connection between its opposite sides; oppositely acting springs normally positioning the feedback member in a neutral position, said means for controlling the pressure in said first and second passageways being operably connected to the feedback member; and a fluid connection between the power valve and one side of said feedback member, the other side of said feedback piston being adapted to be connected to one side of a pressure operated actuator and said power valve being adapted to be connected to the other side of such an actuator.

6. Control means for controlling fluid pressure in a fluid pressure actuator system having a pair of pressure supply conduits comprising: control means for selectively supplying pressure fluid to respective conduits, said means including a cylinder connected with said conduits; a fluid flow control valve slidable longitudinally in said cylinder and normally balanced at a neutral closed position; pressure fluid passageways connected to respective ends of said cylinder to normally apply fluid pressure of equal value to the opposite ends of said valve; a restricted orifice in each pasasgeway upstream of their connections with said cylinder; means for controlling the relative pressures in said passageways to effect actuation of said control valve for selectively supplying actuating pressure to the conduits of the fluid pressure system; feedback means including pressure responsive means interposed in one of said conduits and responsive to the differential of pressure on opposite sides thereof, said pressure responsive means having a restricted connection between said opposite sides; and yielding means for normally positioning said pressure responsive means in a neutral position.

7. In a hydraulic control mechanism: a fluid pressure actuator mechanism adapted to be connected to a device to be actuated, said actuator having a part movable in opposite directions by fluid pressure; power valve means including a movable valve member; yielding means normally balancing said valve member at a neutral position whereat the mechanism is inoperative; feedback means including a feedback cylinder; a feedback piston slidable therein and having a passage therethrough with an orifice therein; a fixed member in said orifice, said member tapering from a larger diameter at the center to smaller diameters at the ends so that as the piston moves from its central neutral position the effective size of the orifice will increase; oppositely acting yielding means normally positioning said piston in a neutral position; a main pressure supply conduit connected with the power valve means; a conduit connecting said power valve means with one side of said actuator; a conduit connecting the other side of said actuator with one end of the feedback cylinder; a conduit connecting said power valve means with the other end of said feedback cylinder; a pair of opposed nozzles spaced apart; a conduit connecting said supply conduit with one of said nozzles and having a restricted orifice therein, said conduit also having a connection with one side of said movable valve member downstream of said orifice; a conduit connecting said supply conduit with the other nozzle and having a restricted orifice therein and a connection, downstream of said orifice, with the other side of said movable valve member; a flapper valve having a resilient part operably mounted between the discharge ends of said nozzles and having an operable connection with the feedback piston; and a torque motor for actuating said flapper valve, said flapper valve, when moved toward one of said nozzles causing an unbalancing of the fluid pressure on the power valve member which effects a fluid connection between the pressure supply conduit and power valve, between said power valve and pressure actuator and between said power valve and feedback cylinder.

8. Control means for controlling fluid pressure in a hydraulic actuator system, including: means defining a cylindrical bore and a valve member slidable in said bore for controlling fluid pressure in said actuator system; yielding means urging the valve member to a normally balanced neutral position; a hydraulic control system for said valve member including a main supply passageway; a first passageway from said main passgewy to one side of said valve member, said passageway having a restricted orifice upstream of its connection with said valve member; a second passageway from the main supply passageway to the other side of said valve member, said second passageway having a restricted orifice therein upstream of the connection with the other side of said valve member; means for controlling the pressure in said first and second passageways downstream of the orifices therein, and to effect unbalancing of the fluid pressures at opposite ends of said valve member to thereby effect actuation thereof; feedback means including a movable feedback member having a variable orifice connection between its opposite sides, the size of said orifice increasing with movements of said member in either direction from a neutral position; oppositely acting springs normally positioning the feedback member in a neutral position, said means for controlling the pressure in said first and second passageways being operably connected to the feedback member; and a fluid connection between the power valve and one side of said feedback member, the other side of said feedback member being adapted to be connected to one side of a pressure operated actuator and said power valve being adapted to be connected to the other side of such an actuator.

9. Control means for controlling fluid pressure in a fluid pressure actuator system having a pair of pressure supply conduits comprising: control means for selectively supplying pressure fluid to respective conduits, said means including a cylinder connected with said conduits; a fluid flow control valve slidable longitudinally in said cylinder and normally balanced at a neutral closed position; pressure fluid passageways connected to respective ends of said cylinder to normally apply fluid pressure of equal value to the opposite ends of said valve; a restricted orifice in each passageway upstream of their connections with said cylinder; means for controlling the relative pressures in said passageways to effect actuation of said control valve for selectively supplying actuating pressure to the conduits of the fluid pressure system; feedback means including pressure responsive means interposed in one of said conduits and responsive to the differential of pressure on opposite sides thereof, said pressure responsive means having a variable connection between said opposite sides, the effective size of said connection being varied with movements of said pressure responsive means; and yielding means for normally positioning said pressure responsive means in an neutral position.

10. Control means for controlling fluid pressure in a fluid pressure actuator system having a pair of pressure supply conduits comprising: control means for selectively supplying pressure fluid to respective conduits, said means including a cylinder connected with said conduits; a fluid flow control valve slidable longitudinally in said cylinder and normally balanced at a neutral closed position; pressure fluid passageways connected to respective ends of said cylinder to normally apply fluid pressure of equal value to the opposite ends of said valve; a restricted orifice in each passageway upstream of their connections with said cylinder; means for controlling the relative pressures in said passageways to effect actuation of said control valve for selectively supplying actuating pressure to the conduits of the fluid pressure system; feedback means including pressure responsive means interposed in one of said conduits and responsive to the differential of pressure on opposite sides thereof, said pressure responsive means having a fixed orifice between said opposite sides; and yielding means for normally positioning said pressure responsive means in a neutral position.

References Cited in the file of this patent

UNITED STATES PATENTS

| | | |
|---|---|---|
| 2,582,088 | Walthers | Jan. 8, 1952 |
| 2,654,348 | Beck | Oct. 6, 1953 |
| 2,688,314 | Holm et al. | Sept. 7, 1954 |
| 2,756,725 | Parker | July 31, 1956 |
| 2,771,062 | Hayner | Nov. 20, 1956 |
| 2,790,427 | Carson | Apr. 30, 1957 |
| 2,797,666 | Chubbuck | July 2, 1957 |
| 2,832,365 | Smith | Apr. 29, 1958 |
| 2,860,606 | Ainsworth | Nov. 18, 1958 |
| 2,904,055 | Witherell | Sept. 15, 1959 |
| 2,909,195 | Keyt | Oct. 20, 1959 |
| 2,934,765 | Carson | Apr. 26, 1960 |
| 2,939,430 | Westbury | June 7, 1960 |
| 2,947,286 | Baltus et al. | Aug. 2, 1960 |